United States Patent [19]
Daniels

[11] Patent Number: 5,458,691
[45] Date of Patent: Oct. 17, 1995

[54] METHOD AND APPARATUS FOR FLUSHING FLUID THROUGH THE INTERSTICES OF SUBSEA UMBILICALS

[75] Inventor: Charles K. Daniels, Houston, Tex.

[73] Assignee: Multiflex, Inc., Magnolia, Tex.

[21] Appl. No.: 196,667

[22] Filed: Feb. 15, 1994

[51] Int. Cl.[6] .................................................. B08B 9/06
[52] U.S. Cl. .................... 134/22.12; 134/10; 134/22.1; 134/22.11; 134/22.18; 134/42
[58] Field of Search .................... 134/10, 22.1, 22.11, 134/22.12, 42, 22.13, 22.14, 22.15, 22.18, 166 R, 169 R, 170; 138/104, 111

[56] References Cited

U.S. PATENT DOCUMENTS

| | | | |
|---|---|---|---|
| 3,526,086 | 9/1970 | Morgan | 138/111 |
| 4,398,567 | 8/1983 | Möll | 138/113 |
| 4,607,701 | 8/1986 | Gundersen | 166/368 |
| 5,127,441 | 7/1992 | Rains | 138/114 |

Primary Examiner—David A. Simmons
Assistant Examiner—Sean Vincent
Attorney, Agent, or Firm—Robert C. Curfiss; Butler & Binion

[57] ABSTRACT

An umbilical is flushed with a fluid to wash out any permeants in the interstices within the umbilical core. A housing may be installed on an open end of the core with the flushing fluid introduced therein, the core elements passing through the housing. In a free-flooding umbilical installation, the flushing fluid may be gravity drained from the top of the umbilical. In other installations, the flushing fluid may be introduced under pressure. Bactericides and other active agents may be added to the flushing fluid, as desired. The flushing fluid is released from the opposite end of the core and may be captured for disposal, recycled, or released into the environment.

25 Claims, 4 Drawing Sheets

5,458,691

METHOD AND APPARATUS FOR FLUSHING FLUID THROUGH THE INTERSTICES OF SUBSEA UMBILICALS

BACKGROUND OF THE INVENTION

1. Field of the Invention

The subject invention is related generally to subsea oil and gas production and is specifically directed to a method and apparatus for flushing fluids through the interstices of subsea umbilicals for removing contaminants therefrom.

2. Discussion of the Prior Art

Typically, subsea oil and gas production operations include a surface control and operating platform for operating and communicating with sea floor production equipment. The operating fluids, control signals and control fluids are transported from the surface platform to the sea floor by a plurality of cables, hoses, control lines and the like usually bundled together and encased in a sheath to form an umbilical.

A typical subsea production control and/or chemical injection umbilical will have hoses of various sizes and pressures, fillers such as, by way of example, polypropylene string fillers, an inner sheath, an armor shield and an outer sheath, such that when the bundle is configured in its final assembly, it is of a circular cross-section and may be manufactured by a continuous extrusion process.

The elements that constitute the core of the umbilical, or the operating components, define an inner bundle of and comprise electrical cables, fiberoptic cables suitable for subsea use, fillers essentially round if preformed fillers, and often hollow, particularly if of any decent size. Frequently, there exists an air gap around the fillers and the hoses and electrical cables. Often a polypropylene slit film filling material is also incorporated, all to make cross-section of the umbilical core as circular as possible. This assembly will then be helically taped to form the core bundle.

The taped core is then fed through an extrusion process or roving process to form an inner sheath which may act merely as protection for the core or, in addition, may serve as bedding for armor wire. The sheathed core is then contra-helically wound with wire or the like to provide an armor layer or layers over the core and to add weight to the assembly to help keep it on the bottom of the sea. In most configurations the armor layers are formed of wire. However, braided polymeric materials have been used and the wire is often coated with a noncorrosive layer to extend the life of the umbilical, or just to expand the operating outer diameter of the wire. The armored core is then fed through an extrusion process or roving process, where the outer sheath is added to encase the entire assembly in a continuous shield to protect the umbilical from the subsea environment.

The inner and outer sheaths of the umbilical form separate barriers. The inner sheath is a barrier which surrounds and is in direct contact with the core and provides a base or bed for the armor. In the case of an unarmored umbilical, the inner sheath basically holds the core in assembly and acts as an outer sheath, as well. The inner sheath may, but is not required to, seal the core of the umbilical.

Umbilicals formed in this manner have gained wide spread acceptance, and have achieved substantial success in the industry. Such umbilicals are used to transfer, among other materials, control fluids to the sea floor. There are several types of fluids used including, but not limited to, various corrosion inhibitors, scale inhibitors, hydrate inhibitors, foam inhibitors and the like. Some of these materials are such that they will readily permeate through the typical hose lining material in hoses in the core. Once this occurs, the permeated fluid is free to contact and interfere with the remaining components of the core, often increasing the deterioration rate of the umbilical.

Heretofore, the core materials have been altered or modified in order to eliminate or minimize the permeation rate and the deleterious effects of such permeation. For example, nylons have a fairly high rate of permeation, while Hytrel® brand materials have a little less rate of permeation, and these are two commonly-used hose liner materials. It has been found that fluoropolymers have much, much lower permeation rates. In any event, all known materials will permit permeation over time, and since umbilicals may be deployed from five to up to thirty years, over a period of time the interstices of the core will become saturated with the permeated fluids.

While minute or small quantities of such permeated fluids or contaminants do not present danger, the hazards increase as the fluids become more concentrated. The permeation phenomenon is such that even where the pressure inside the hose is lower than the hydrostatic pressure outside the hose the permeant will still pass through the hose an into the interstices of the core. While the rate of permeation is somewhat pressure dependent, it still exists.

Methanol, as an example, will permeate from the lower pressure area into the higher pressure area, regardless of the pressure differential. Such permeation will eventually cause contamination of other control fluids as the permeant permeates through the hose liner, into interstices, back through the elements that make up the control line hoses, and into the control fluids inside the hoses. While under normal circumstances such permeation might not be a problem, there are cases where continued permeation can create a serious risk. Not only will the permeation of the methanol dilute it as a control fluid, the permeation process may disturb the lubrication properties or the corrosion inhibition properties of other fluids in the umbilical. Moreover, if the permeated methanol finds its way back into a surface reservoir, for example, as in a closed system where the control fluid is pumped down to the well and is returned via a return line into a surface reservoir, any methanol in the reservoir on the surface platform can create a fire or an explosion hazard. Also, in some cases, over time the methanol can degrade the quality and physical properties of other plastic materials within the core of the umbilical.

To date, the problem has been addressed by altering the core encapsulating materials. While this may ultimately provide a desirable solution, there remains a need for an effective and inexpensive way to solve the permeation problems of new umbilicals as well as to eliminate or minimize the permeation problems associated with the thousands of umbilicals currently installed and in use.

SUMMARY OF THE INVENTION

The subject invention is directed to a novel apparatus and method for flushing permeated contaminants from an umbilical, minimizing any long term effects thereof while not requiring any modification of the architecture of the basic umbilical. The flushing action may be intermittent or continual, as needed. It is a significant feature of the subject invention that it can be retrofitted on existing umbilical installations without requiring that the umbilicals be removed from operation. The present invention takes advantage of the interstices built into the core of presently configured umbilicals to flush and remove the permeants before they are allowed to accumulate to hazardous concentration levels.

Specifically, it has been found that flushing fluids can be introduced into the core of the umbilical and gently flushed along the interstitial pathways of the umbilical core to wash any permeants and other contaminants out of the umbilical, where they may be captured or harmlessly dissipated into the environment. In the preferred embodiment of the invention, the surface end of the umbilical is fitted with a housing forming a chamber at the top end of the core and circumscribing the inner sheath. The core elements, that is, the control lines, fiber optic cables, fluid hoses and the like, pass through the housing. An inlet port is provided in the housing and a flushing fluid is introduced therethrough. The flushing fluid is gravity drained into the interstitial passageways of the core and flows along the length of the umbilical until it is released through the sea floor end of the core. As the flushing fluid flows through the core, it washes with it any permeated fluids or other contaminants, greatly minimizing any risk of the contaminants percolating up to the surface platform and substantially eliminating the cross-contamination of the other elements of the core and any fluids contained therein.

The released fluids at the sea floor end of the core are preferably harmlessly released into the sea. However, where desired, the flushing fluid and contaminants can be captured and recycled. The invention is particularly well suited for use with free-flooding umbilicals, where both the surface end and sea floor end of the core are open whereby the interstices in the core may be exposed to sea water. However, it will be understood that the flushing method of the invention could be used with a sealed system. Further, the flushing flow could be upward from the sea floor toward the sea surface, where desired, provided the hydrostatic pressure, or head, in the interstitial passageways is sufficiently overcome to promote the flushing action.

In the preferred embodiment, deionized water is utilized as the flushing fluid. However, other suitable fluids can be readily adapted to the apparatus and method of the subject invention. Where desired, a neutralizing fluid may be used to neutralize certain contaminates or permeants. Further, a bactericide may be added to reduce the naturally occurring bacterial growth in the core.

In new installations, gravity flow of the flushing fluid will generally be sufficient to initiate the process. In such operations the housing merely forms an inlet for the fluid and a passageway for the core elements. In retrofit operations, it may be necessary to overcome the "head" caused by the accumulated permeants and other possible contaminants in the interstitial passageways within the core. In such applications, the housing is closed, with a seal being formed around the various core elements which pass through the housing. The flushing fluid is then introduced, under pressure, into the housing and into the interstices of the core. Once the head is overcome, the pressure can be reduced and a gravity drain will be sufficient to keep the process in operation.

The flushing apparatus and method of the invention is also useful in subsea-to-subsea umbilical installations, for example, between a manifold and a tree, or similar installations. In such an operation, the housing is preferably sealed, and the release end may be either open or of the capture and recycle type, as desired.

It is, therefore, an object and feature of the subject invention to provide an apparatus and method for minimizing the accumulation of permeants and other contaminants in the interstitial passageways of a subsea umbilical.

It is a further object and feature of the invention to provide an apparatus and method for reducing the cross-contamination of core elements of an umbilical through permeation.

It is a specific object and feature of the subject invention to provide an apparatus and method for flushing a fluid through the interstitial passageways of an umbilical core to wash any permeants from the core.

It as an additional object and feature of the subject invention to provide an apparatus and method for removing accumulated permeants from the core of an installed umbilical without modifying the umbilical or without removing it from operation.

Other objects and features of the invention will be readily apparent from the accompanying drawings and the detailed description of the preferred embodiments, which follows.

DETAILED DESCRIPTION OF THE PREFERRED EMBODIMENTS

Figure 1:
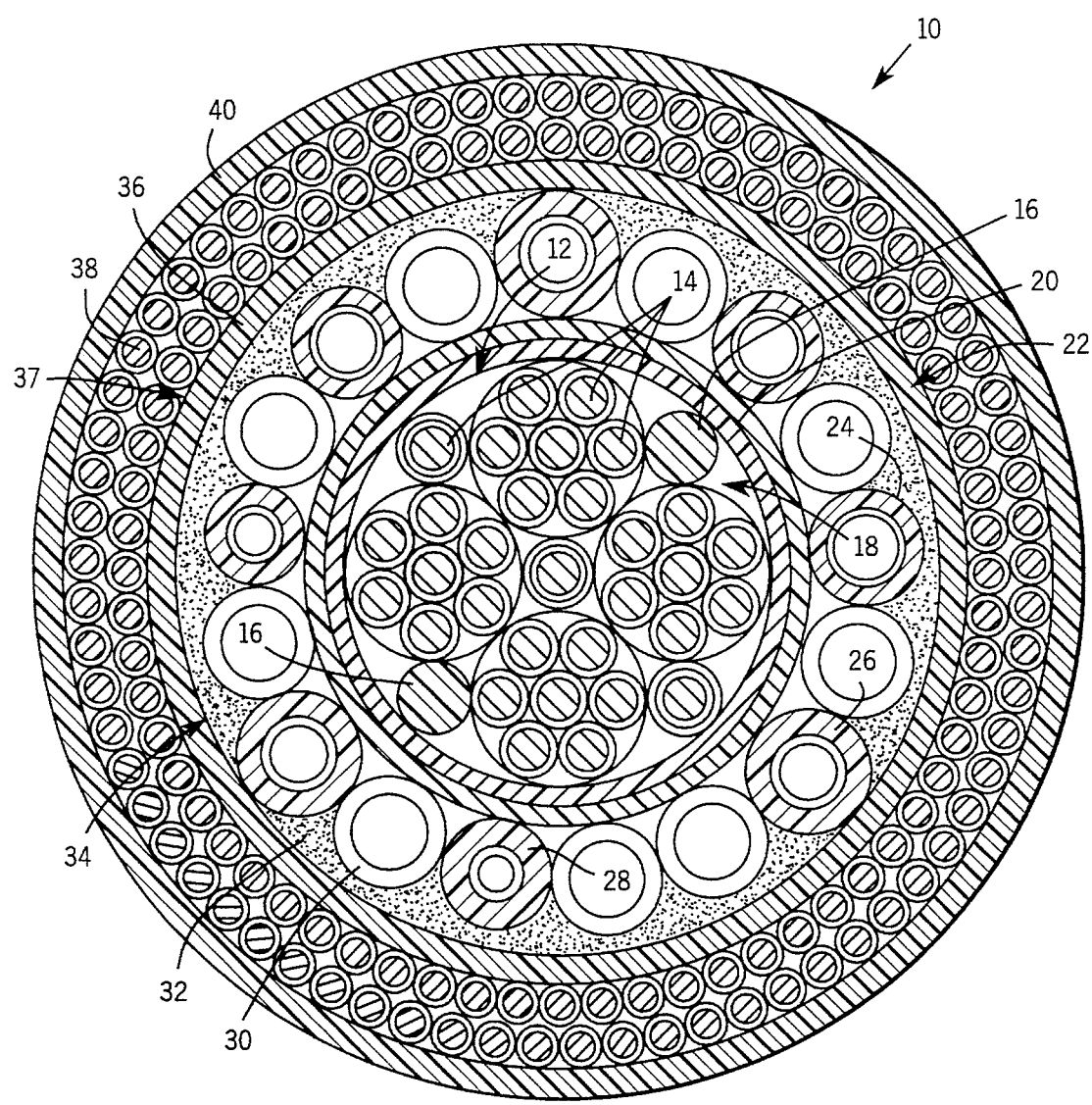
FIG. 1 is a cross-sectional view of a first embodiment of a prior art subsea umbilical of the type which may be used in combination with the subject invention.
Figure 2:
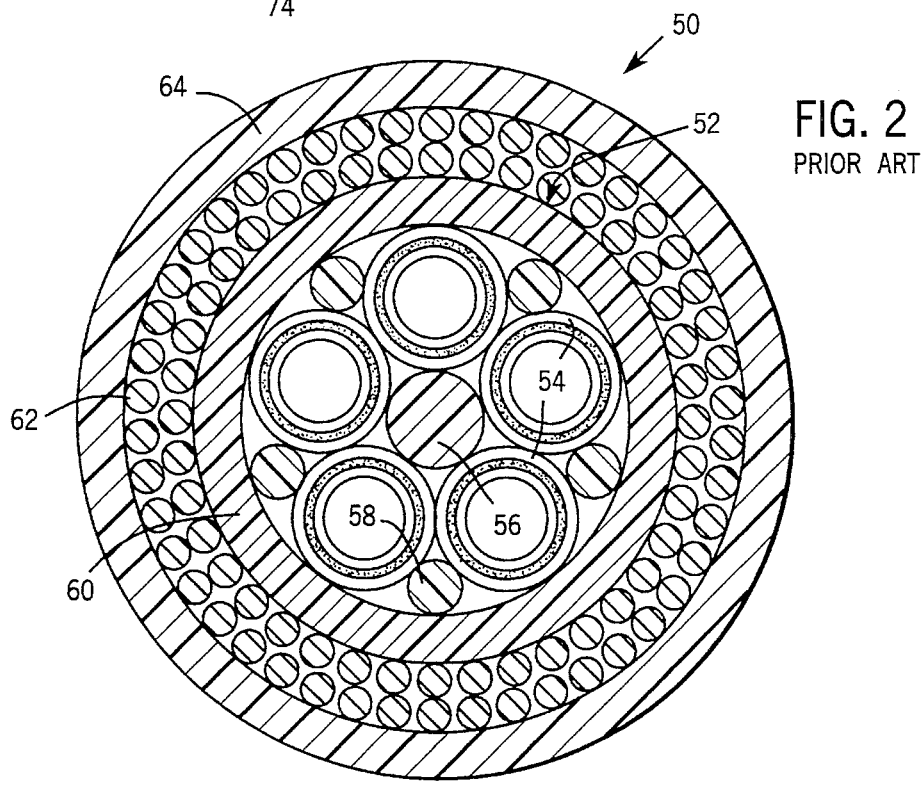
FIG. 2 is a cross-sectional view of a second embodiment of a prior art subsea umbilical of the type which may be used in combination with the subject invention.

Typical cross-sections of prior art subsea umbilicals of the type used in conjunction with the present invention are shown in FIGS. 1 and 2. With specific reference to FIG. 1, the umbilical 10 is of a generally circular cross-section. The umbilical is a layered umbilical with an inner core 12 comprising primarily electrical cables 14, tubular filler 16 and interstitial filler strands or similar filler at 18. A cable core cover or conduit 20 made of a non-conductive material such as nylon or the like bundles the electrical cables and filler. The outer core 22 includes a plurality of hoses 24, 26 and 28 spaced radially about the cable sheath 20 and held in position by tubular filler elements 30 and filler such as the polypropylene filler 32. The entire core is then helically taped to bundle the core elements as indicated at 34. An inner sheath 36 covers the bundled, taped core. This may be any of a variety of materials, but polyurethanes or polyethelenes are often the materials of choice, typically about 0.2 inches in thickness. A typical umbilical of the type illustrated in FIG. 1 has a wrapped, sheathed core 37 of about five inches in diameter. The protective armor shield 38 generally comprises galvanized steel wire, often jacketed with an inert material to increase it thickness. An outer sheath 40 is applied to the armor shield and may consist of a variety of materials, typical materials of choice being 0.2 inch polyurethane, polyethelene or Hytrel® brand materials which may be continuously extruded around the armored, sheathed core.

A second embodiment of a typical prior art umbilical is shown in FIG. 2. The umbilical 50 includes a single core 52 having a plurality of hoses 54 held in position by non-metallic filler elements 56, 58 to form a generally circular cross-section. This bundle is then taped, as in FIG. 1 and jacketed in an inner sheath 60. The sheathed core of a typical umbilical in this configuration is approximately 2 to 2.5 inches in diameter. As with the configuration of FIG. 1, an armor jacket 62 is applied to the core and covered with an outer sheath 64.

As is typical of all umbilicals constructed in the manner illustrated in FIGS. 1 and 2, interstices develop between the various operative elements and the filler material in the core, creating interstitial passageways extending the length of the umbilical. The subject invention takes advantage of these interstitial passageways to wash out permeants, and where desired, other contaminants, within the core. The invention is particularly useful in flushing permeating chemical injection fluids such as methanol and the like which permeate from the respective control line or hose into the core interstices and from there into other control elements in the core. It has been found that this is a more reliable method of controlling permeation than the current method of making the control lines less permeable. Heretofore, suitable materials have not been found for this purpose. By flushing the permeants from the core, the permeant hazard is minimized. This has been shown to be more effective than attempting to eliminate the permeant altogether. Moreover, the present apparatus and method can be applied to the many existing umbilical installations without taking the umbilical out of service and without changing the umbilical configuration.

Figure 3:
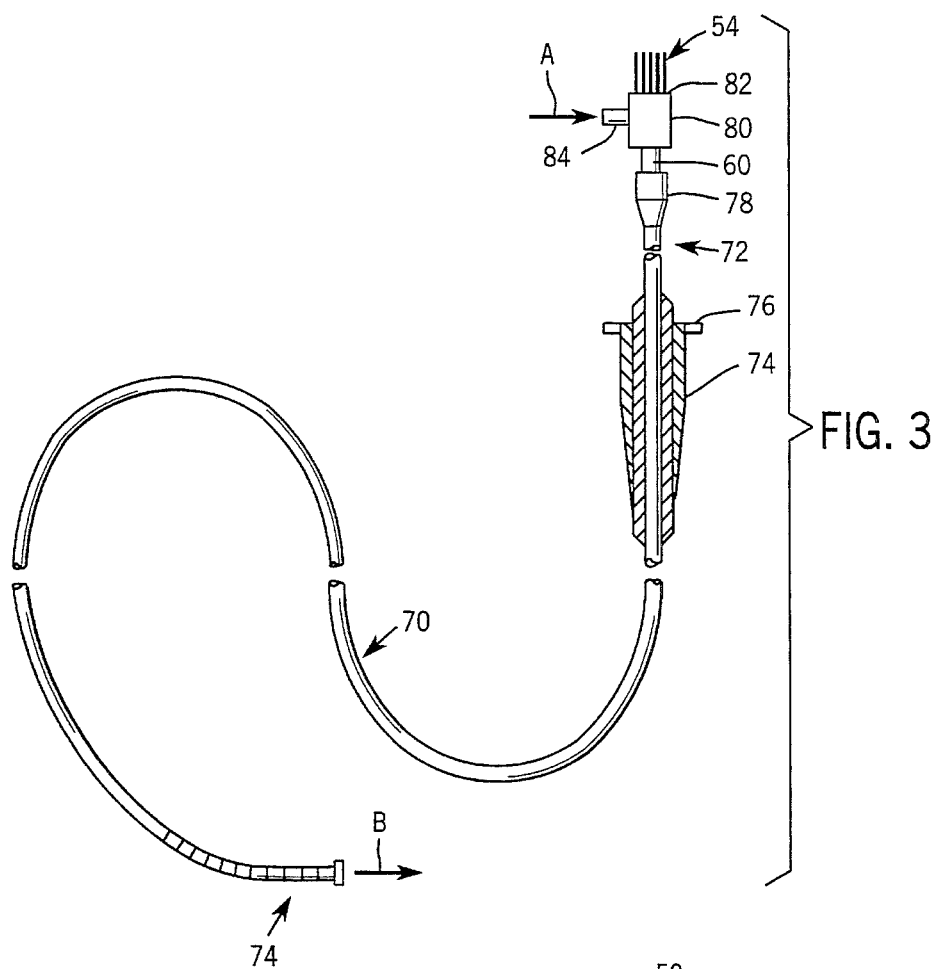
FIG. 3 is a view of an umbilical assembly including the flushing apparatus of the preferred embodiment of the subject invention.

FIG. 3 illustrates a typical installation showing an umbilical in combination with the apparatus of the preferred embodiment of the invention for practicing one of the novel methods disclosed herein. As there shown, the elongated umbilical 70 includes an upper end 71 and a lower end 74. For purposes of discussion, the umbilical of FIG. 2 is utilized in the assembly of FIG. 3. In a typical installation, the upper end 72 of the umbilical passes through a bend stiffener, having a hang off flange 76 for securing the stiffener to the surface platform in the manner well known to those skilled in the art. In some cases, the stiffener 76 is cast directly onto the umbilical outer sheath. The outer end of the umbilical is then received in a snag-resistant armor termination armor termination 78. In some cases, the hang off flange may be above the termination 78, as desired depending on the particular application. The outer sheath 64 and armor layer 62 (see FIG. 2) terminate at the bend stiffener 78. The inner sheath 60 passes through the stiffener 78 and is stripped away for exposing the core elements 54, which may be secured to various operating components on the surface platform.

In the preferred embodiment, a housing 80 is installed in circumscribing relationship with the inner sheath 60. The core elements 54 pass through the upper wall 82 of the housing. An inlet port 84 is provided in the housing and communicates with the interstices in the core via the housing chamber 86. A flushing fluid is introduced through inlet port 84, as indicated by arrow A, and through chamber 86 into the interstitial passageways of the core. The flushing fluid then gravity drains through the umbilical 70, and is released at the lower end 74 as indicated by arrow B.

The flushing fluid may include any of a variety of fluids and additives, depending upon the conditions being treated and the method of disposal or recycling utilized for the flushing fluid. Deionized water has been effective for removing permeants from the core with a minimum negative impact on the environment. Bactericides and other additives may be included as desired, depending upon the conditions of each particular installation.

Figure 4:
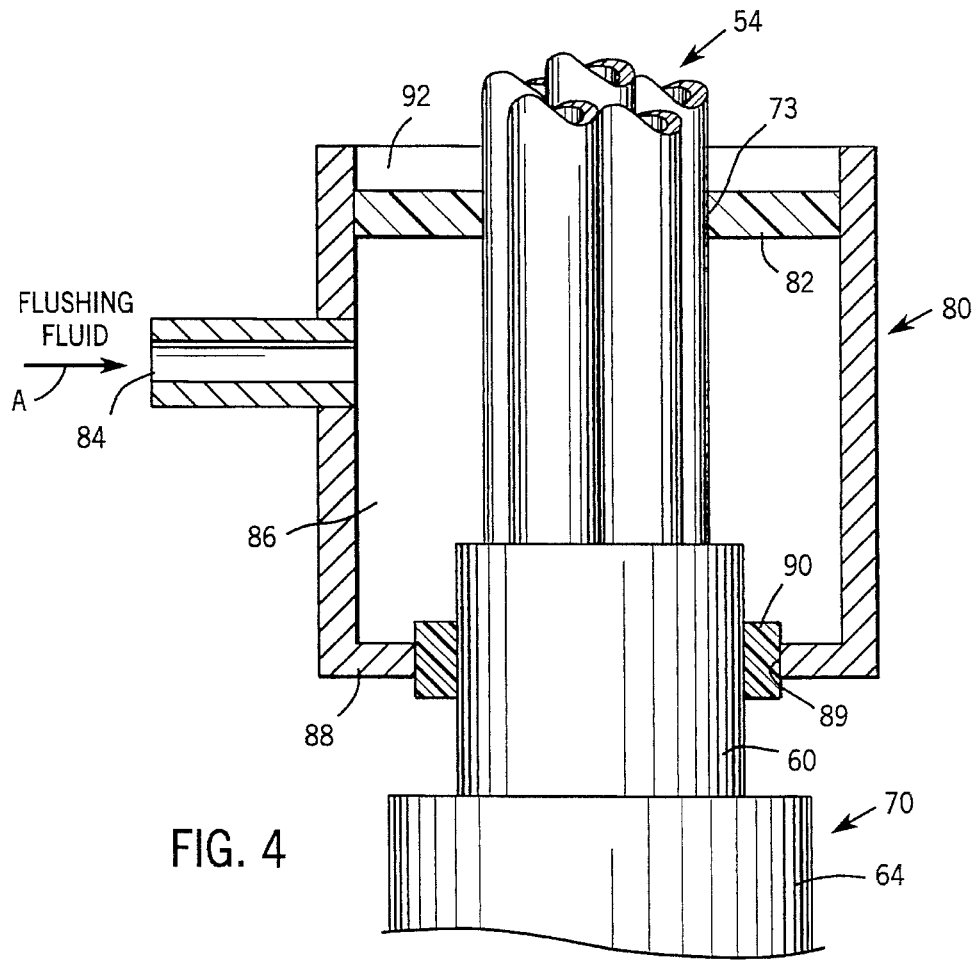
FIG. 4 is an enlarged view of the housing of the preferred embodiment of the invention for introducing fluids into the interstitial passageways of the core of an umbilical, in accordance with the methods of the invention.

The housing 80 is more clearly shown in FIG. 4. The termination 78 has been removed for clarity of illustration. The lower wall 88 circumscribes the exposed inner sheath 60 outwardly of the terminated outer sheath 64 and armor layer 62 (see FIG. 2). A seal 90 is placed between the annulus 89 of wall 88 and core 60 to seal the housing. Known gasket materials may be used, particularly since the gasket is only exposed to deionized water or similar flushing fluids. The gasket may be a fitted finished gasket or may be poured in place. The upper wall of the preferred embodiment is a non-metallic plate 72 having a central opening 73 for receiving the core elements 54. Where desired, a potting material or similar seal 92 may be utilized to seal and close the housing, forming a hermetically sealed chamber 86. Where gravity drain is relied on, the housing need not be sealed and the upper wall may be omitted altogether. In applications where the flushing fluid is introduced under pressure, the seals are recommended to minimize leaks between the housing and the umbilical components.

Figure 5:
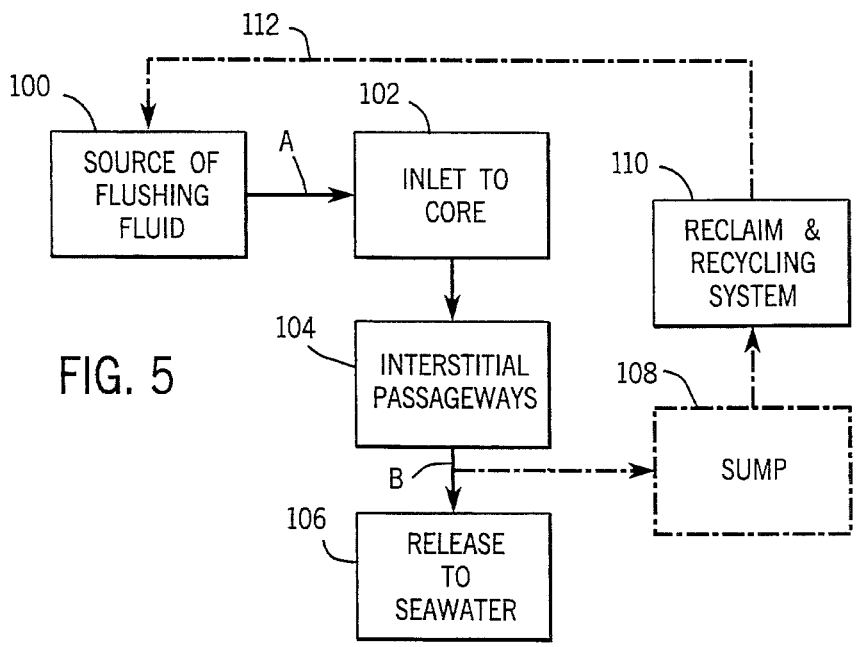
FIG. 5 is block diagram of a first embodiment of the apparatus and method of the subject invention, showing gravity flushing of a free-flooding umbilical, and including an optional capture and recycling system.
Figure 6:
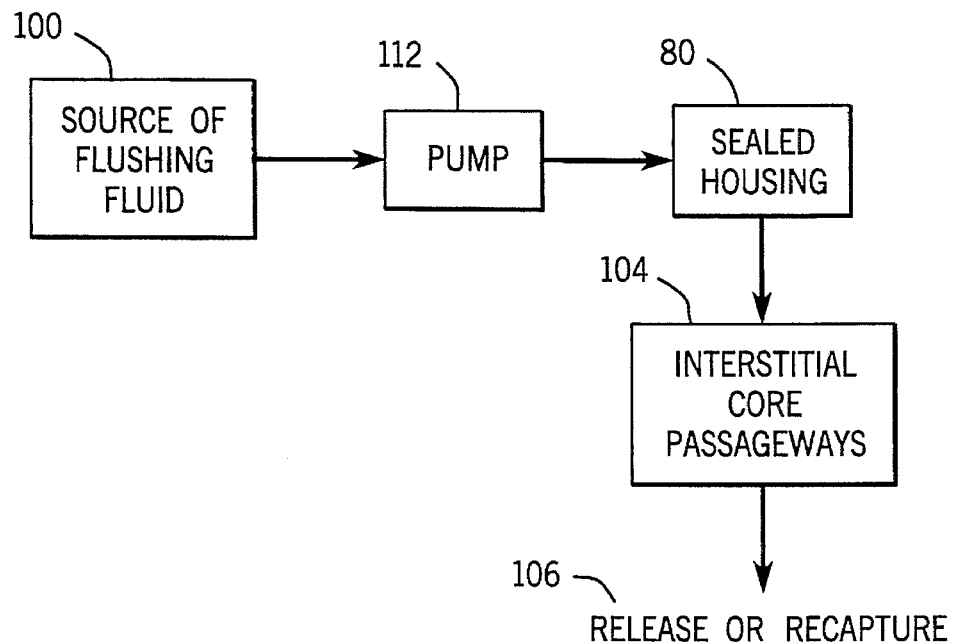
FIG. 6 is a block diagram of a second embodiment of the apparatus and method of the subject invention, showing a pressurized flushing of an umbilical.
Figure 7:
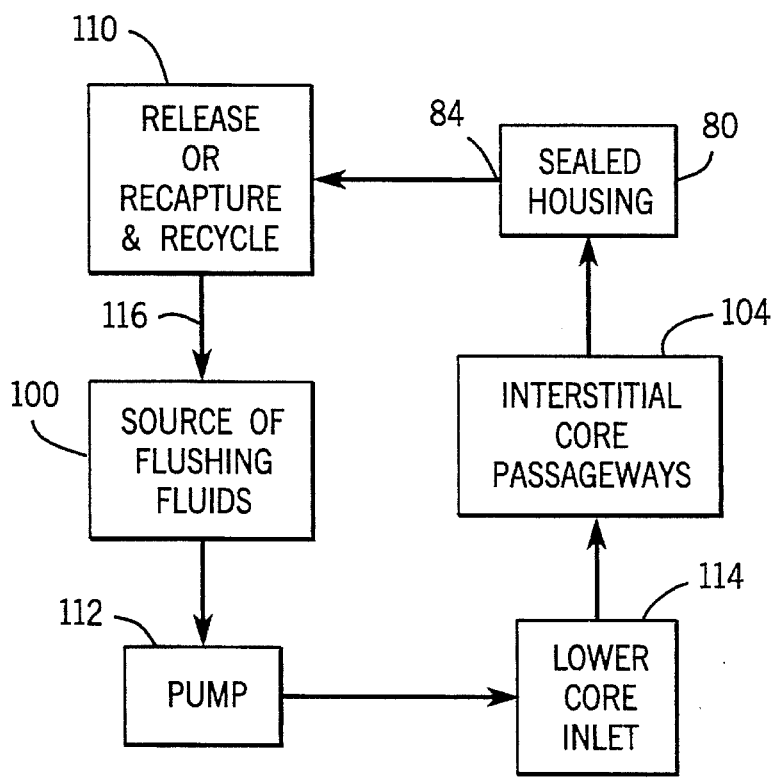
FIG. 7 is a block diagram of another embodiment of the apparatus and method of the subject invention, showing an upwardly flushing system.

Block diagrams illustrating the flow process of the various configurations of the invention are shown in FIGS. 5, 6 and 7. The preferred embodiment for new installations, particularly suited for use with free-flooding umbilicals, is shown in FIG. 5. The arrows A and B correspond the arrows A and B in FIG. 3. A source of fluid 100 releases flushing fluid into the core inlet 102 by gravity drain, as indicated by arrow A. The fluid then gravity flows through the interstitial passageways of the core as indicated at 104 and is released into the seawater as indicated at 106. Where it is not desirable to release the flushing fluid into the sea water, an alternative collection and/or recycling system is shown in phantom and may be employed. In such installations, the released flushing fluids at arrow B are diverted into a sump 108 where they may be collected for disposal, or where desired, reclaimed and recycled on line as indicated at 110. The reclaimed flushing fluids are then returned to the fluid reservoir 100 via line 112. Typically, the reclaimed fluids will be pumped out of the recycling system on an as needed basis.

An alternative embodiment is shown in FIG. 6 and is particularly well suited for retrofit applications. In many installed systems, contamination and permeant concentration have built up over many years, clogging the interstitial passageways of the core. In such instances, the sealed housing 80 is used and is in communication with the core passageways as shown at 104 and as illustrated in FIGS. 3 and 4. A pump 112 is positioned in line with the system for supplying the flushing fluid from source 100 under a pressure sufficient to overcome the hydrostatic pressure in the core. The released fluids at 106 may be released to the sea water or recaptured and/or recycled, as shown in FIG. 5.

It is also possible to use the invention in an up feed system as shown in FIG. 7. In such an application, the flushing fluids from source 100 are introduced under pressure into the lower end 114 of the core. A pump 112 is supplied in line with the system for pumping the flushing fluids up through the interstitial passageways of the core as indicated at 10 and out into the sealed housing 80 where the fluids are released via port 84 and may be released to the environment or recaptured as indicated at 110. Where desired, an in line recycling system may be used and the reclaimed fluids may be reintroduced into the reservoir 100 as indicated at 116.

A closed loop system such as that shown in FIG. 7 is also particularly well suited for subsea-to-subsea applications, such as, by way of example, for umbilicals running between a tree and a manifold or the like.

The subject invention has proven to be a successful alternative to eliminating permeation by minimizing the risks and hazards associated with permeants without eliminating the permeants, per se. While certain features and embodiments of the invention have been described in detail herein, it will be understood that the invention encompasses all enhancements and modifications within the scope and spirit of the following claims.

What is claimed is:

1. An apparatus for removing permeants released into the interstitial passageways of an umbilical of the type having a core with opposite ends, the core including a plurality of elements housed therein and extending the length of the umbilical, and interstices between said elements, at least one of said elements containing a fluid capable of permeating through the element and entering the interstices of the core, the apparatus comprising:

a. a housing for receiving one end of the core, the elements of the core passing through the housing; and
   b. means associated with the housing for introducing a flushing fluid into the interstitial passageways of the core through the one end thereof, whereby the fluid may flow into said one end of the core and out of the other end of the core.

2. The apparatus of claim 1, wherein the housing is a closed housing and there is further included:

a. a seal surrounding each of the elements of the core as said elements pass through the housing; and
   b. a port for introducing a flushing fluid into the housing.

3. The apparatus of claim 2, further including a pressure supply means for introducing the flushing fluid into the housing under pressure.

4. The apparatus of claim 1, further including a reservoir associated with the other end of the core for capturing the flushing fluid flowing therethrough.

5. The apparatus of claim 4, further including a recycling system in communication with the reservoir and the housing for recycling the flushing fluid.

6. The apparatus of claim 1, wherein said one end of the core is above said other end of the core.

7. The apparatus of claim 3, wherein said one end of the core is below said other end of the core.

8. The apparatus of claim 1, wherein the flushing fluid is deionized water.

9. The apparatus of claim 1, wherein the flushing fluid contains a bactericide.

10. A method for flushing permeants from the interstitial passageways of the core of a subsea umbilical of the type having a peripherally sealed core with opposite ends, a plurality of operative elements comprising control lines and conduits extending the length of the core, at least one of which carries a permeable medium, and interstices between the various elements and within the core to form interstitial passageways within the core, the permeating medium permeating from the element into the interstices, the method comprising the steps of:

a. exposing an open end of the core, with the operative elements projecting beyond the open end;
   b. introducing a flushing fluid into the open end of the core;
   c. flushing the interstitial passageways of the core with the flushing fluid; and
   d. releasing the flushing fluid from the opposite end of the core.

11. The method of claim 10, wherein step "d" includes releasing the flushing fluid into the environment.

12. The method of claim 10, further including the step of capturing the released flushing fluid for subsequent disposal.

13. The method of claim 10, further including the steps of capturing the released flushing fluid and recycling the released flushing fluid to step "b".

14. The method of claim 10, wherein the open end is above the opposite, release end and the flushing step is by gravity drain.

15. The method of claim 10, wherein in step "b", the flushing fluid is introduced under pressure.

16. The method of claim 15, wherein the open end is below the opposite, release end.

17. The method of claim 10, further including the step of sealing the open end from the environment between steps "a" and "b".

18. A method of removing permeants released into the interstitial passageways of an umbilical of the type having a core with opposite ends, the core including a plurality of elements housed therein and extending the length of the umbilical, and interstices between said elements, at least one of said elements containing a fluid capable of permeating through the element and entering the interstices of the core, the method comprising the steps of:

a. installing a housing in circumscribing relationship about one end of the core, with the elements of the core passing through the housing;
   b. introducing a flushing fluid into the housing and therethrough into said one end of the core;
   c. flushing the interstitial passageways of the core with the flushing fluid; and
   d. releasing the flushing fluid from the other end of the core.

19. The method of claim 18, further comprising the step of sealing each of the elements of the core within the housing before step "b".

20. The method of claim 18, wherein step "d" includes releasing the flushing fluid into the environment.

21. The method of claim 18, further including the step of capturing the released flushing fluid for subsequent disposal.

22. The method of claim 18, further including the steps of capturing the released flushing fluid and recycling the released flushing fluid back to the housing.

23. The method of claim 18, wherein the open end is above the opposite, release end and the flushing step is by gravity drain.

24. The method of claim 18, wherein in step "b", the flushing fluid is introduced under pressure.

25. The method of claim 18, wherein the open end is below the opposite, release end.

* * * * *